United States Patent [19]

Berger

[11] 4,131,920

[45] Dec. 26, 1978

[54] CLOSED-CLOCK WRITING SYSTEM FOR A ROTATING MAGNETIC MEMORY

[75] Inventor: James K. Berger, Malibu, Calif.

[73] Assignee: Pioneer Magnetics, Santa Monica, Calif.

[21] Appl. No.: 843,555

[22] Filed: Oct. 19, 1977

[51] Int. Cl.$^2$ ............................................. G11B 5/09
[52] U.S. Cl. ..................................................... 360/51
[58] Field of Search .................................. 360/54, 51

[56] References Cited

U.S. PATENT DOCUMENTS

| | | | |
|---|---|---|---|
| 2,801,407 | 7/1957 | Lubkin | 360/51 |
| 2,926,341 | 2/1960 | Scarborough | 360/51 |
| 3,531,787 | 9/1970 | Fuller | 360/51 |
| 3,893,172 | 7/1975 | Celek | 360/51 |

*Primary Examiner*—Vincent P. Canney
*Attorney, Agent, or Firm*—Keith D. Beecher

[57] ABSTRACT

A system is provided for recording a closed clock track on a rotating magnetic memory disc or drum. The system includes a temporary clock generating circuit for recording clock flux reversals in a temporary clock track on the memory, and a temporary clock reading circuit for sensing the flux reversals in the temporary clock track and for recording flux reversals at a higher frequency in a final clock track on the memory. The temporary clock generating circuit is automatically controlled to cause selected pairs of the flux reversals in the temporary track to be recorded at a certain frequency ratio to the flux reversal pairs in the final track, and to cause the remaining flux reversal pairs in the temporary clock track to be recorded at a different frequency ratio to the flux reversal pairs in the final clock track to avoid track closure error. The temporary clock reading circuit is automatically controlled to respond to the flux reversals in the temporary clock track which accrue at the first and second frequency ratios and still record the flux reversals in the final track at a selected constant higher frequency.

6 Claims, 6 Drawing Figures

TEMPORARY CLOCK GENERATING CIRCUIT

TEMPORARY CLOCK READING CIRCUIT

TIMING DIAGRAM FOR TEMPORARY CLOCK WRITING OPERATION

TIMING DIAGRAM FOR TEMPORARY CLOCK READING

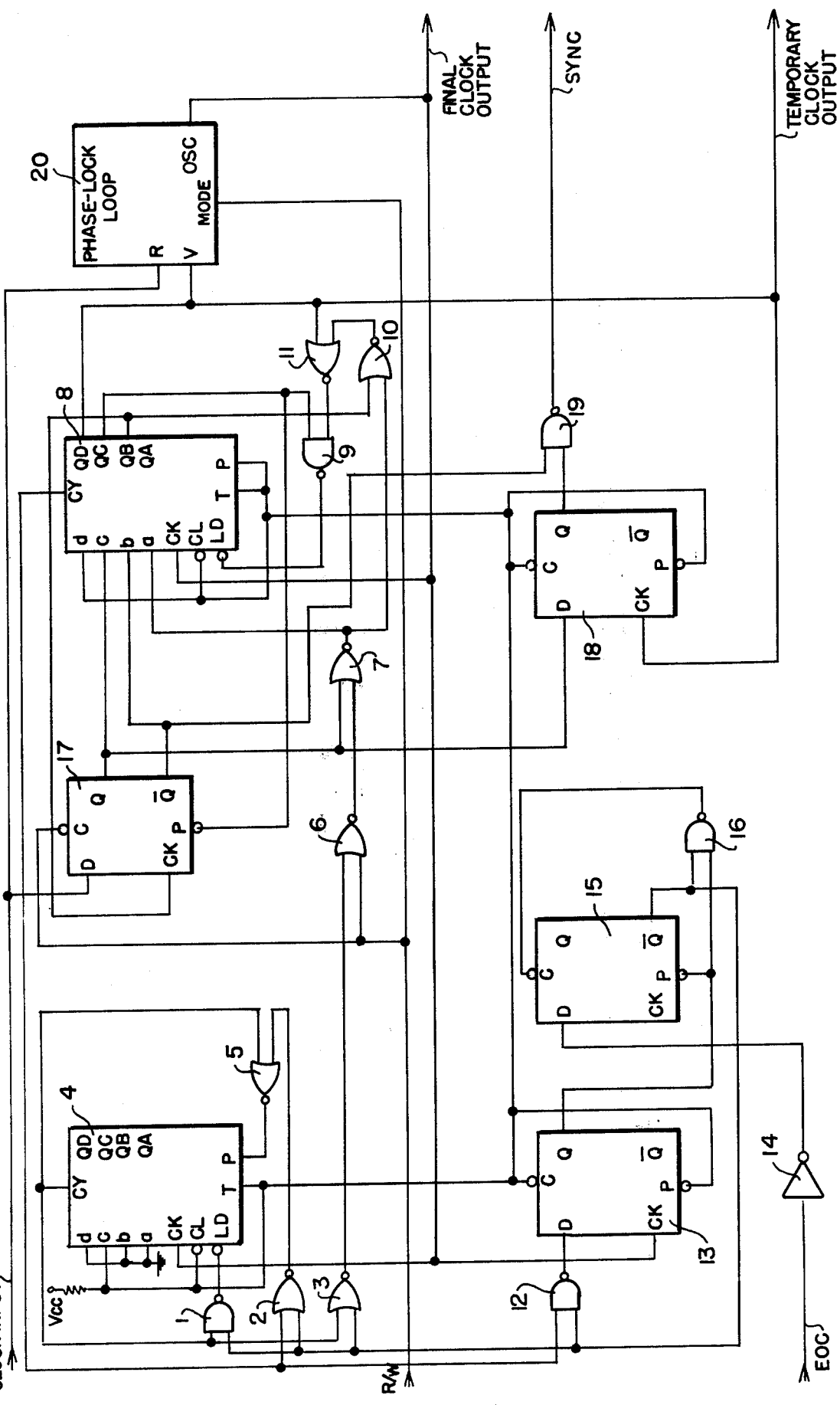
FIG.6 COMBINED TEMPORARY CLOCK CIRCUIT

CLOSED-CLOCK WRITING SYSTEM FOR A ROTATING MAGNETIC MEMORY

BACKGROUND OF THE INVENTION

In the manufacture of many magnetic digital disc and drum memory systems, it is necessary to record a closed clock track around the disc or drum. Such a closed clock track consists of a certain number of uniformly spaced magnetic flux reversals, so that as the disc or drum rotates a continuous train of clock pulses may be read out from the magnetic read head associated with the clock track. It is important in these systems for the train of pulses to have a high degree of uniformity, and for the point of closure where the end of the writing of the flux reversals meets the beginning to be indistinguishable from the other parts of the clock track. Systems for writing closed clock tracks around a magnetic memory disc or drum of acceptable quality are known in the art. For example, U.S. Patent 3,540,022 which issued November 10, 1970 to the present inventor describes one such system.

One object of the present invention is to provide an improved system for writing a closed clock track around a magnetic memory disc or drum which will permit clock magnetic flux reversals to be written at higher frequency and higher density than was possible in the prior art systems. A second object is to provide an improved system for writing auxiliary tracks, commonly called sector or address tracks, around a magnetic memory, disc or drum simultaneously with the writing of the clock track. U.S. Patent 3,755,790 which issued August 28, 1973 to the present inventor describes one type of prior art apparatus for writing sector and address tracks on a rotating magnetic memory disc or drum.

It is usual in the prior art to record a clock track on a rotating magnetic memory drum or disc in the following manner. First, an index, or origin, pulse is written on a first track on the magnetic memory disc or drum. Then, by means of an oscillator whose frequency can be controlled either manually or automatically, a series of uniformly spaced magnetic flux reversals are recorded on a second, temporary intermediate clock track on the magnetic memory. Whether manual or automatic, the procedure is to start writing the oscillator output onto the second memory track when an index pulse is received, and stop writing the oscillator output when the next index pulse is received. The number of clock pulses so written on the second track is then counted (or determined at the time of writing). If the number is too low, the oscillator frequency is increased and the operation is repeated; and if the number is too high, the oscillator frequency is decreased, and another attempt is made. The aforesaid operations are repeated until the exact desired number of pulses has been written on the temporary clock track. The temporary track now has the number of flux reversals desired for the final clock track. Such a method is described, for example, in Patent 3,540,022, and such a method may be used to synchronize the clock oscillator used in the system of the present invention.

The temporary track in the prior art systems has some degree of what is commonly called closure error. Closure error is the failure of the flux reversals at the beginning and end of the temporary clock track to match exactly, so that the spacing between the beginning flux reversal and the final flux reversal is not the same as, and is not indistinguishable from, the spacing of all the other flux reversals in the temporary track.

In addition to closure error, the flux reversals in the temporary clock track in the prior art system may be amplitude modulated at the point of closure, this being due to the effect of turning off the output from the clock oscillator too abruptly.

The final steps in the prior art procedure, accordingly, are to read the flux reversals on the temporary clock track, process the resulting clock pulses through a phase-locked loop, and to write the output of the phase-locked loop onto a third final clock memory track on the rotating memory disc or drum. During these final steps the amplitude of the output of the clock oscillator is reduced very slowly to zero and over a period of time corresponding to many memory revolutions, so as to avoid amplitude modulations of the flux reversals in the final clock track.

The phase-locked loop in the prior art system includes a filter which has a narrow band-pass, so that the closure error of the clock pulses derived from the temporary track on the rotating memory may be filtered out, and so that the closure error may appear to a much lesser degree in the final clock track.

The prior art procedure described in the preceding paragraphs has certain disadvantages. For example, the density and frequency of the flux reversals in the final clock track, which are the same as the density and frequency of the flux reversals in the temporary clock track must be limited in such prior art systems to a value which does not seriously reduce the amplitude of the flux reversals in the temporary clock track, and the ability of the system to read the flux reversals in the temporary clock track in the presence of read/write crosstalk. The foregoing criterion limits the density and frequency of the flux reversals in the final clock track to that which can be read in the presence of writing during the clock track recording process, rather than the higher density and frequency which can be read in the absence of writing during normal operation of the memory.

A second disadvantage in the prior art system is that frequently the system cannot sense some of the flux reversals in the temporary track because of the amplitude modulation thereof due to the write turn-off operation, thereby causing the control of the turn-off to be unnecessarily critical.

A third disadvantage in the prior art system is that because the temporary clock track has no intentional position mark encoded in it, the temporary clock track cannot conveniently be used to record final sector or address tracks simultaneously with the final clock track. This is because such sector and address tracks frequently require a position reference to establish their alignment.

It is accordingly, a further object of the present invention to provide a system for writing the flux reversals in the temporary clock track and for reading the flux reversals in the temporary clock track, such that the disadvantages of the prior art system described above are obviated.

Flux reversals in the temporary clock track in the system of the invention are written at a lower density and frequency than in the final clock track. In the preferred embodiment of the invention, the flux reversals in the temporary clock track are written at one-eleventh of the frequency of the flux reversals in the final clock track. Therefore, for each eleven flux-reversal pairs in the final clock track, one flux-reversal pair is written in the temporary clock track. At the beginning of the temporary clock track, however, one flux-reversal pair is written for each twelve flux-reversal pairs in the final clock track, and this occurs no fewer than one time, and no more than eleven times, as required to accomodate the remainder when the certain number of flux-reversal pairs in the final clock track is divided by eleven.

For example, if the number of flux-reversal pairs in the final clock track is 11,003 there will be one flux-reversal pair in the temporary clock track corresponding to the first twelve flux-reversal pairs in the final clock track; one flux-reversal pair corresponding to the second twelve flux-reversal pairs of the final clock track; one flux-reversal pair corresponding to the third twelve flux-reversal pairs of the final clock track; and then one flux-reversal pair for each eleven flux-reversal pairs in the final clock track from there on to the end. The total number of flux-reversal pairs in the temporary clock track is therefore one thousand. It can be seen that this improved temporary clock track overcomes the aforementioned disadvantages of the prior technique, since the density and frequency of the flux reversals in the final clock track are not limited by the flux reversals in the temporary clock track because the flux reversals in the temporary clock track are written at much lower density and frequency. Moreover, the flux-reversals in the temporary clock track in the system of the invention are written so far apart in time and distance that the output from the write oscillator may be turned off entirely between flux-reversals, thus obviating amplitude modulation of the flux-reversals due to decaying current at the time of writing turn-off. The first occurrence of the more widely spaced flux-reversals in the temporary clock track (where they are spaced twelve units apart instead of eleven) serves as a position marker in the temporary clock track which may be used to establish alignment of sector and/or address tracks.

BRIEF DESCRIPTION OF THE DRAWINGS

FIG. 6 is a logic block diagram of a combined reading and writing circuit in accordance with a preferred embodiment of the invention.

DETAILED DESCRIPTION OF THE INVENTION

Figure 1:
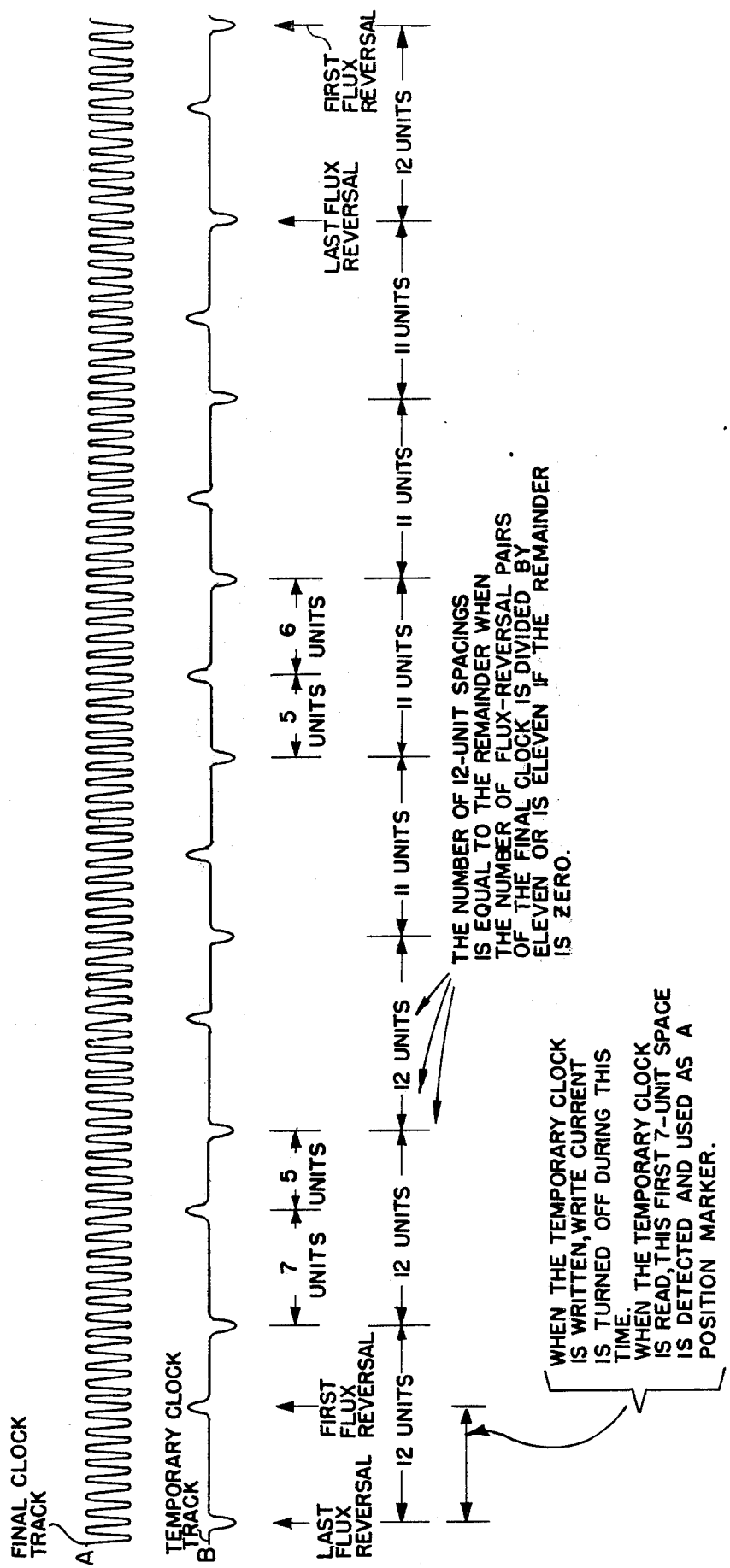
FIG. 1 is a representation of curves showing the relationship between the magnetic flux-reversals in the temporary and final clock tracks of a rotating magnetic memory when the system of the present invention is used.

The relationship between the flux reversals in the temporary clock track and in the final clock track on a rotating magnetic memory disc or drum when the writing operation is carried out by the preferred embodiment of the system of the invention is shown in FIG. 1.

Curve A in FIG. 1 represents the flux reversals in the final clock track on the rotating magnetic memory drum or disc, and curve B represents the flux reversals in the temporary clock track. As shown, the flux reversals in the temporary clock track B are written at one-eleventh of the frequency of the flux reversals in the final clock track A. At the beginning of the temporary clock track B, however, one flux reversal pair is written for each twelve flux reversal pairs in the final clock track A, and this occurs three times. Thereafter, one flux reversal pair is written in the temporary clock track B for each eleven flux-reversal pairs in the final clock track A.

Figure 2:
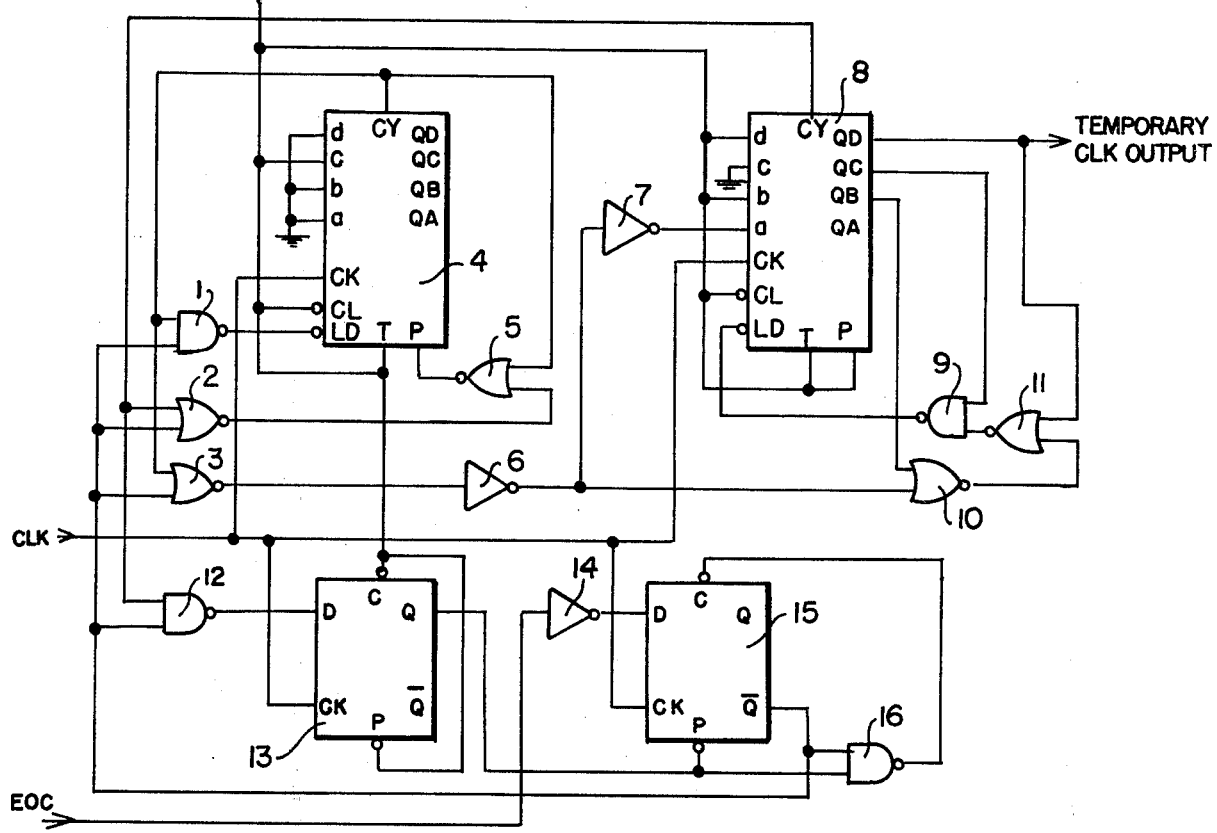
FIG. 2 is a logic block diagram of a temporary clock generating circuit included in the system of the invention in the embodiment to be described.

Integrated circuits 4 and 8 in the temporary clock generating circuit of FIG. 2 are binary synchronous counters such as commercial type SN74161N; inverters 6, 7 and 14 may be type SN7404N; "nor" gates 2, 3, 5, 10 and 11 may be type SN7402N; "nand" gates 1, 9, 12 and 16 may be type SN7400N; and flip-flops 13 and 15 may be type SN7474N. The inputs of the circuit of FIG. 2 are CLK, which is the output of the variable frequency oscillator referred to above and which may be of any appropriate known type and synchronized with the rotating memory in the manner described in Patent 3,540,022; and input EOC, which is a pulse which is logically true for the duration of one oscillator cycle out of every N cycles, where N is the number of clock cycles desired in the final clock. The EOC pulse may be generated by a binary counter (not shown) which is driven by the CLK signal, and which counts to the desired N count and then synchronously resets to 1 and counts again. The synchronous reset counter pulse may be used as the EOC pulse.

In the circuit of FIG. 2, elements 6, 7, 8, 9, 10 and 11 form a network which counts in two modes. In the first mode, the signal at the input of inverter 6 is logically false. For such a condition, counter 8 will count to binary 0010, and then synchronously load to 0101, and then count again to 0010, repetitively. In this mode, the QD output is true for six counts and then false for five counts repetitively, producing an output which when written on the rotating magnetic memory disc or drum will cause a negative flux reversal followed five counts later by a positive flux reversal, followed six counts later by a negative flux reversal, and so on, such as shown in curve B of FIG. 1.

If the signal at the input of inverter 6 is logically true, the circuit is in its second mode. When that occurs, counter 8 will count to binary 0110, and then synchronously load to 1101, and then count again to 0110, and so on. In this latter mode the QD output is true for five counts and then false for seven counts repetitively, producing an output which when written on the rotating magnetic memory drum or disc will cause a negative flux reversal followed seven counts later by a positive flux reversal, followed five counts later by a negative flux reversal, and so on, as is also shown in curve B of FIG. 1.

Also in the circuit of FIG. 2, counter 4 is a binary counter which counts modulo twelve, by counting to binary 1111 and then synchronously loading to binary 0010. Counting and loading of counter 4 are controlled by flip-flop 15, through gates 1, 2 and 5. When counter 4 is in the 1111 state, the CY output is true, causing the output of gate 5 to be false, which inhibits counting; and enabling gate 1 so that the synchronous load can occur when the $\overline{Q}$ output of flip-flop 15 becomes true. Gate 2 controls counting after the synchronous load such that counting occurs when the $\overline{Q}$ output of flip-flop 15 is true, or when counter 8 contains binary 1111. Gate 3 causes the mode of counter 8 to be divide-by-12 when the $\overline{Q}$ output of flip-flop 15 is false, and counter 4 is not in the 1111 state waiting to load. Otherwise, counter 8 is in the divide-by-11 mode.

Also, in the circuit of FIG. 2, the $\overline{Q}$ output of flip-flop 15 is clocked true when EOC becomes true, and remains true due to the latching path from the $\overline{Q}$ output through gate 16 to the CLEAR terminal, until counter 8 counts to the 1111 state causing the Q output of flip-flop 13 to be clock to the false state, which forces the $\overline{Q}$ output of flip-flop 15 to the false state again.

The operation of the circuit of FIG. 2 is as follows. When the counter 8 is in the divide-by-11 mode, the counter 4 remains in the 1111 state. When EOC input becomes true, the $\overline{Q}$ output of flip-flop 15 is set true, which enables the load function of counter 4. Counter 4, following load, counts each clock time until counter 8 reaches the 1111 state, and then the $\overline{Q}$ output of flip-flop 15 returns to the false state causing counter 8 to operate in the divide-by-12 mode and causing counter 4 to count only once each time counter 8 completes a cycle. When counter 4 reaches the 1111 state, counter 8 returns to the divide-by-11 mode.

Figure 3:
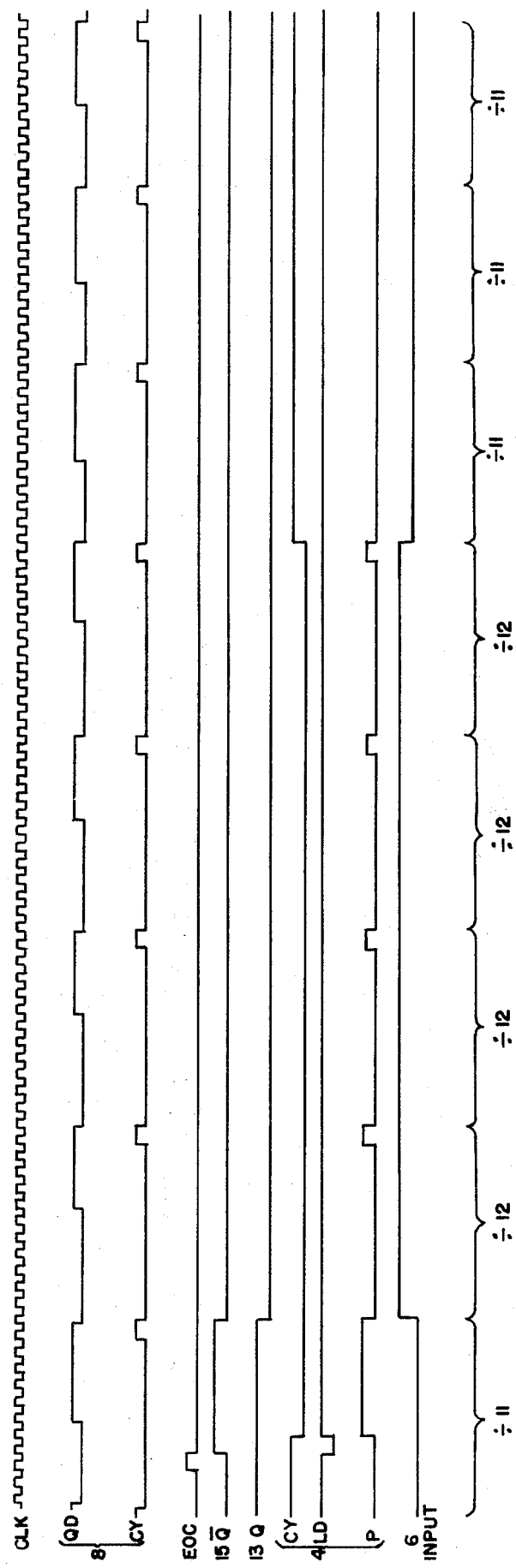
FIG. 3 is a timing diagram for writing the flux reversals in the temporary clock track.

The timing diagram of FIG. 3 illustrates the timing relationships discussed in the preceding paragraph. The timing diagram of FIG. 3 represents the case in which the number of bits in the final clock, N, when divided by eleven yields a remainder of four.

It is important to observe the method by which the EOC input pulse becomes located with respect to the CY output of counter 8. The initial occurrence of the EOC input pulse is at an arbitrary position with respect to the CY output of counter 8. Assume, for the purpose of illustration, that the EOC pulse occurs three CLK periods too late with respect to the CY output of counter 8, causing three extra divide-by-twelve cycles to occur. This puts three extra counts into the counters 4 and 8, so that one the next revolution of the memory disc or drum, the EOC pulse will occur three CLK periods sooner with respect to those counters, which is the correct location. Since the number of divide-by-twelve cycles will now be correct to accommodate the remainder exactly, the EOC pulse will continue to occur in the same position for each disc or drum revolution thereafter.

Similar reasoning will show that the EOC pulse will correct itself from any arbitrary initial position. This phenomenon is an important feature of the present invention.

The temporary CLK output of FIG. 2, when applied to a write amplifier and written on a rotating memory disc or drum becomes the flux-reversal pattern of curve B of FIG. 1.

Figure 4:
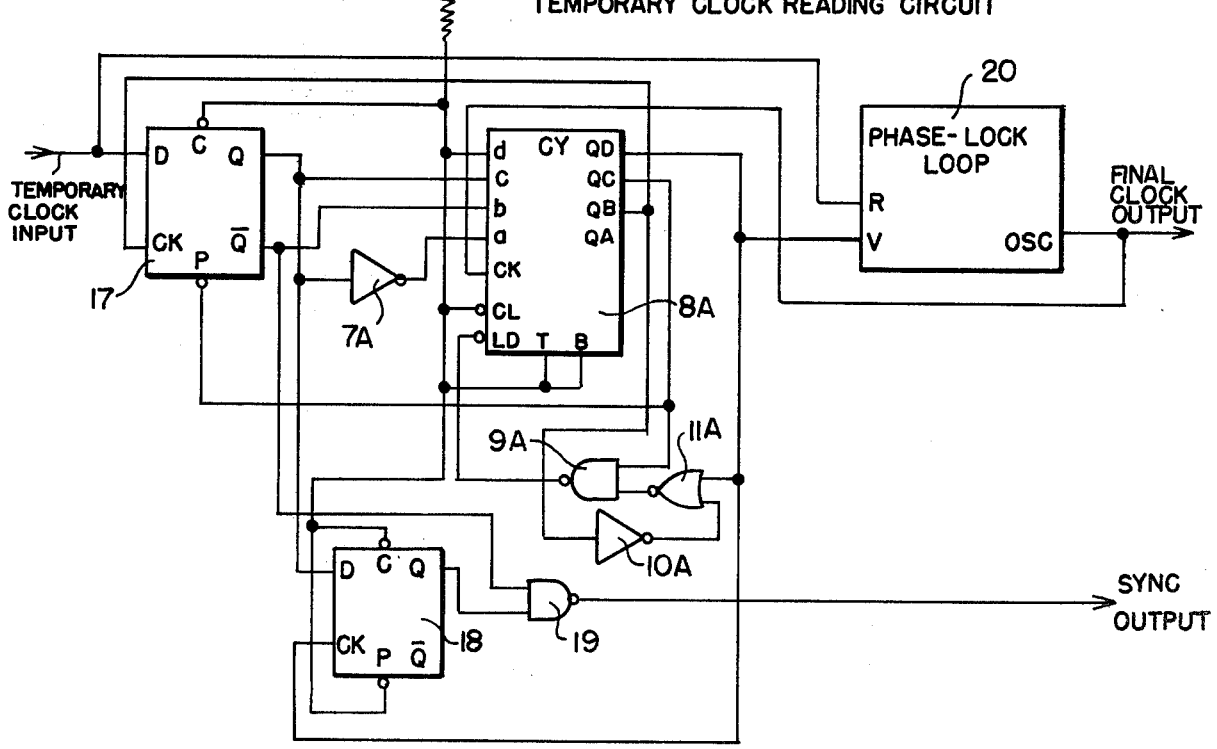
FIG. 4 is a logic block diagram of a circuit for reading the flux reversals in the temporary clock track and which is included in the system of the invention.

Reference is now made to FIG. 4 for a description of the temporary clock reading circuit which is included in the system of the invention. Integrated circuits 17 and 18 are flip-flops, and may be of the commercial type presently designated SN7474N. "nand" gates 9A and 19 may be of the type presently designated SN7400N. "nor" gate 11A may be of the type presently designated SN7402N. Inverters 7A and 10A may be of the type presently designated SN7404N. Counter 8A may be of the type presently designated SN74161N.

Phase-lock loop 20 is not necessarily an integrated circuit but may be constructed with a combination of integrated circuits and discrete elements. The construction and operation of phase-lock loops is well known in the art and will not be described in detail herein, except to point out that the loop circuit has a digital phase-frequency detector having a reference signal input R and a variable signal input V, both of which react only to negative signal transitions. The loop circuit 20 also has an oscillator output terminal OSC.

The temporary clock input of the circuit of FIG. 4 is the digital output of a read amplifier which reads the flux-reversals of the temporary clock on the rotating memory drum or disc, and it is the same as the output of circuit of FIG. 2.

Figure 5:
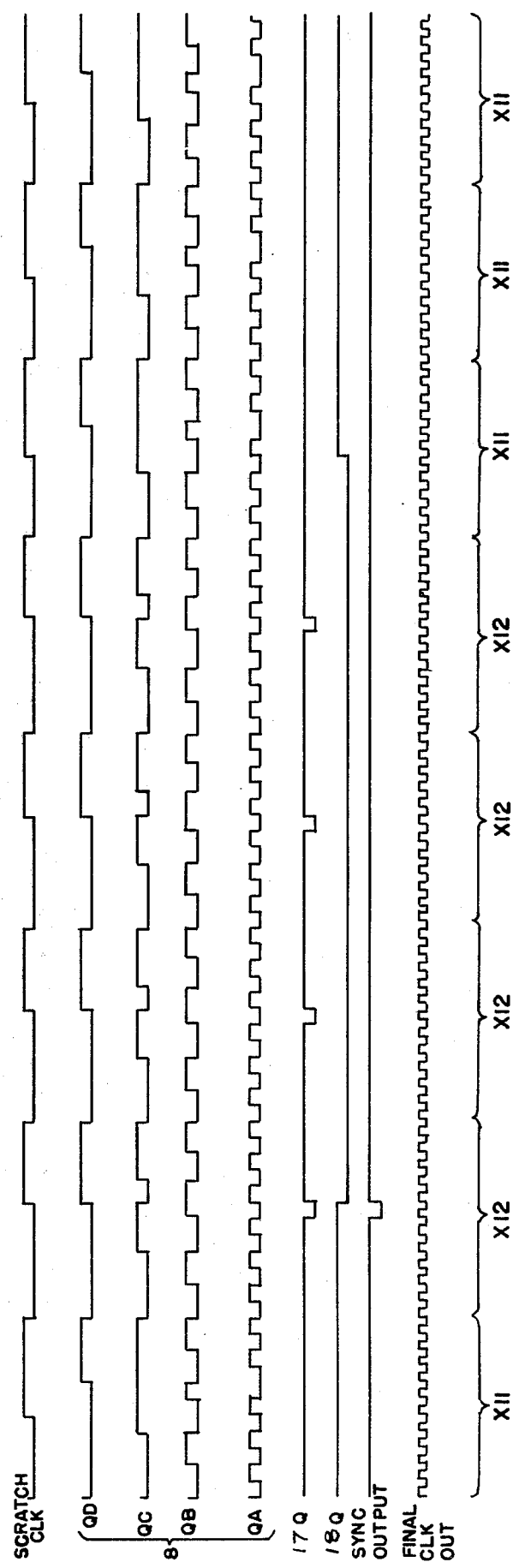
FIG. 5 is a timing diagram for reading the flux reversals in the temporary clock track.

Counter 8A and gates 9A, 10A and 11A in the circuit of FIG. 4 form a network which counts modulo 11 or modulo 12 according to the state of flip-flop 17 at a certain time in the cycle of counting. Phase-lock loop 20 operates to cause the negative transition of the temporary clock input signal to coincide with the negative transition of the counter 8 QD output. At the sixth oscillator cycle after the negative transition, the QB output of counter 8 makes a positive transition, setting flip-flop 17 to whichever state the temporary clock is in at that time, thus determining the count modulus for that cycle. Gate 19 generates a sync output when flip-flop 17 is first set to the state which causes a modulo 12 count, and flip-flop 18 terminates the sync output after the first pulse. The timing diagram of FIG. 5 illustrates these relationships.

The sync output of the circuit shown in FIG. 4 occurs once per memory drum or disc revolution, regardless of the number of divide-by-twelve cycles in the temporary clock, and so may be used to index address and sector tracks on the rotating memory drum or disc.

It may be observed that the circuits of FIGS. 2 and 4 contain similar elements, these being designated by the same numbers, with an "A" being added to the numbers in FIG. 4. It is possible to construct a circuit which, like the circuit of FIG. 2, may be used for generating the temporary clock; and which, like the circuit of FIG. 4, also may be used for reading the temporary clock, and in which the like elements are shared. Such a circuit is shown in FIG. 6. The circuit of FIG. 6 is the presently preferred embodiment of the invention.

The circuit of FIG. 6 operates in the same manner as the individual circuits of FIGS. 2 and 4. The R/W signal introduced to the circuit of FIG. 6 is a control signal which causes the circuit to operate in the READ mode when the R/W signal is true, and to operate in the WRITE (or generate) mode when the R/W signal is false. The MODE input terminal to phase-lock loop 20 causes the phase-lock loop to operate normally when the signal applied to that signal is true; and causes the oscillator to be separated for control by the frequency-determining circuits of the clock writing process when the applied signal is false, so that the oscillator may be shared by the reading and writing modes.

It will be appreciated that while particular embodiments of the invention have been shown and described modifications may be made; and it is intended in the claims to cover all embodiments which come within the true spirit and scope of the invention.

What is claimed is:

1. A closed clock writing system for a rotating magnetic memory for recording a selected number of uniformly spaced magnetic flux reversals in a final clock track on the memory, said writing system comprising: a clock generating circuit for recording a plurality of magnetic flux reversals in a temporary clock track on the memory at a selected frequency and density corresponding to a selected sub-multiple of the flux reversals to be recorded in the final clock track, the clock generating circuit including circuitry for causing selected pairs of the flux reversals to be recorded in the temporary track at a certain frequency ratio to the flux reversal pairs in the final track, and to cause the remaining flux reversal pairs to be recorded in the temporary track at a different frequency ratio to the flux reversals in the final track to accommodate the remainder when the number of flux reversals in the final track is divided by a selected number; a clock reading circuit for sensing the flux reversals in the temporary track and for recording flux reversals at a higher frequency and density in the final clock track on the memory, and circuitry included in said clock reading circuit for causing the flux reversals to be recorded in the final track at a constant higher frequency and density than the pulses recorded in the temporary track regardless of the aforesaid frequency ratios.

2. The writing system defined in claim 1, in which said circuitry causes at least one pair of flux reversals to be recorded in the temporary clock track at said certain frequency ratio.

3. The writing system defined in claim 1, in which said clock generating circuit is connected to a source of clock pulses, and in which said clock generating circuit records said flux reversals in said temporary clock track at the certain and different frequency ratios with sufficient spacing to enable the source to be turned off entirely between such flux reversals so as to obviate amplitude modulation of the flux reversals.

4. The writing system defined in claim 1, in which said clock generating circuit records a selected one of said flux reversals in said temporary clock track at said certain frequency ratios to serve as a position marker for sector and address tracks on said memory.

5. The writing system defined in claim 1, in which said circuitry included in said clock generating circuit includes a first counter which is controllable to count in either of two modes.

6. The writing system defined in claim 5, in which said circuitry included in said clock generating circuit includes a second counter for controlling the mode of operation of said first counter to establish the number of flux reversal pairs in the temporary clock track at said certain frequency ratio.

* * * * *